(12) United States Patent
Marzouki

(10) Patent No.: US 8,034,854 B2
(45) Date of Patent: Oct. 11, 2011

(54) BITUMEN MIXTURE AND USE THEREOF

(75) Inventor: Taieb Marzouki, Thedinghausen (DE)

(73) Assignee: Bertram Haupt, New Port Richey, FL (US)

( * ) Notice: Subject to any disclaimer, the term of this patent is extended or adjusted under 35 U.S.C. 154(b) by 0 days.

(21) Appl. No.: 12/664,516

(22) PCT Filed: Jun. 19, 2008

(86) PCT No.: PCT/EP2008/004934
§ 371 (c)(1),
(2), (4) Date: May 25, 2010

(87) PCT Pub. No.: WO2008/155118
PCT Pub. Date: Dec. 24, 2008

(65) Prior Publication Data
US 2010/0292369 A1  Nov. 18, 2010

(30) Foreign Application Priority Data
Jun. 21, 2007 (DE) .......................... 10 2007 029 045

(51) Int. Cl.
*C08L 95/00* (2006.01)
*C08L 91/08* (2006.01)

(52) U.S. Cl. ........................................................ 524/62
(58) Field of Classification Search .................... 524/62
See application file for complete search history.

(56) References Cited

FOREIGN PATENT DOCUMENTS

| | | | |
|---|---|---|---|
| DE | 199 52 846 A1 | 5/2001 | |
| DE | 100 28 107 A1 | 12/2001 | |
| DE | 101 26 249 A1 | 12/2001 | |
| DE | 10028107 A1 | * 12/2001 | |

OTHER PUBLICATIONS

International Preliminary Report on Patentability with Search Report for PCT/EP2008/004934 dated Nov. 14, 2008.

* cited by examiner

*Primary Examiner* — Ling Choi
*Assistant Examiner* — Hui Chin
(74) *Attorney, Agent, or Firm* — Laurence P. Colton; Smith Risley Tempel Santos LLC

(57) ABSTRACT

A bitumen mixture for high-performance overlayment roofing membranes having an only minimally higher SBS rubber content, compared with simple roofing membranes, and a comparatively high filler content. The bitumen mixture provides high-quality overlayment roofing membranes having a distinctly reduced SBS rubber content, compared to prior art overlayment roofing membranes, coupled with a nonetheless high filler content.

18 Claims, No Drawings

BITUMEN MIXTURE AND USE THEREOF

STATEMENT OF RELATED APPLICATIONS

This patent application claims the benefit of and is the United States Chapter II National Phase of Patent Cooperation Treaty International Application No. PCT/EP2008/004934 having International Filing Date 19 Jun. 2008, which is based on and claims the benefit of German Patent Application No. 10 2007 029 045.6 having a filing date of 21 Jun. 2007, both of which are incorporated herein in their entireties by this reference.

BACKGROUND OF THE INVENTION

1. Technical Field

The invention relates to a bitumen mixture for high-quality built-structure waterproofing systems, namely a bitumen mixture for an overlayment roofing membrane comprising at least distillation bitumen, SBS rubber and at least one filler.

2. Prior Art

Built-structure waterproofing systems comprising bitumen mixtures are used as roofing membranes, bridge waterproofing systems, basement envelopes and the like. Roofing membranes are used as roof waterproofing systems in the flat-roof sector in particular. Such roof water-proofing systems are generally made multilayered by disposing an overlayment roofing membrane on at least one underlayment roofing membrane. The overlayment roofing membrane, which is exposed to the elements and in particular high mechanical and thermal stresses, has to meet particularly high requirements. Therefore, overlayment roofing membranes, like other highly stressed built-structure waterproofing systems, are produced from high-quality bitumen mixtures. Such high-quality bitumen mixtures are based on polymer-modified bitumen. Polymer-modified bitumen is appreciably more costly than oxidic bitumen, used for example to produce roofing membranes which have to meet lower requirements, such as underlayment roofing membranes for example.

Both oxidic bitumen and polymer-modified bitumen are based on distillation bitumen. In the case of polymer-modified bitumen, distillation bitumen is modified with suitable polymeric materials of construction, such as SBS rubber or APP (atactic polypropylene), while in the case of oxidic bitumen the distillation bitumen is progressively oxidized at high temperatures of about 280° C. by addition of oxygen.

Distillation bitumen is inherently very soft and therefore cannot be used alone as bitumen material for high-quality built-structure waterproofing systems, in particular overlayment roofing membranes. To meet the requirements of high-quality built-structure waterproofing systems, the SBS rubber content has to be at least 10% by weight. Because SBS rubber is very costly, this greatly adds to the cost of the bitumen mixture.

Bitumen mixtures are admixed with fillers to reduce cost. The most common fillers are slate flour or limestone flour. Owing to the high viscosity, it is generally not possible to produce bitumen mixtures having a filler content of more than 30% by weight. This holds for high-quality built-structure waterproofing systems in particular.

BRIEF SUMMARY OF THE INVENTION

It is an object of the present invention to provide a bitumen mixture for high-quality built-structure waterproofing systems which is based on distillation bitumen and with very low additions of SBS rubber meets the requirements of high-quality built-structure waterproofing systems despite a high filler content.

DETAILED DESCRIPTION OF PREFERRED EMBODIMETNS

We have found that this object is achieved by a bitumen mixture for an overlayment roofing membrane comprising at least distillation bitumen, SBS rubber and at least one filler, characterized by an SBS rubber content of greater than 3% by weight to less than or equal to 8% by weight, up to 6% by weight of a mixture of high-boiling saturated hydrocarbons, so-called flux oil, and up to 3% by weight of solid paraffins having a chain length ranging from $C_{50}$ to $C_{70}$ and a solidification point of above about 95° C. The inventors found that, surprisingly, an SBS rubber content of more than 3% by weight to 8% by weight is sufficient when, as well as distillation bitumen and at least one filler, the bitumen mixture further comprises up to 6% by weight of a mixture of high-quality saturated hydrocarbons, so-called flux oil, and up to 3% by weight of solid paraffins having a chain length ranging from $C_{50}$ to $C_{70}$ and a solidification point of above about 95° C. The flux oil and the special paraffin permit a comparatively low SBS rubber content. Nonetheless, such an inexpensive bitumen mixture provides a high-performance built-structure waterproofing system.

It is already known to produce bitumen mixtures for roofing membranes having an even lower SBS rubber content; but these are not suitable for high-quality built-structure waterproofing systems, only for those having to meet lower requirements with regard to their mechanical and thermal properties in particular. Surprisingly, the small amount which the invention requires the SBS rubber content to be raised compared with known bitumen mixtures for simple roofing membranes, such as underlayment roofing membranes, results in comparatively high requirements being met. More particularly, the bitumen mixture of the invention leads to better rheology and lower viscosity and the consequence that, in the course of the production of the roofing membrane, the polyester nonwoven typically used as a ply can be processed gently and installation weldability is good and fast.

In a development of the invention, the bitumen mixture comprises more than 3% by weight to 8% by weight of SBS rubber, up to 6% by weight of flux oil, up to 3% by weight of solid paraffins having a chain length ranging from $C_{50}$ to $C_{70}$ and a solidification point of above about 95° C., up to 70% by weight of fillers, in particular 30% by weight to 70% by weight of fillers, and also distillation bitumen. The distillation bitumen content is such that the distillation bitumen forms the remainder of the entire bitumen mixture, i.e. that proportion of 100% by weight which is not attributable to SBS rubber, flux oil, solid paraffins and fillers.

Preferably, the distillation bitumen remainder as a proportion of the entire bitumen mixture is between 30% by weight and 60% by weight.

An alternative preferred bitumen mixture above 3% by weight but not more than 8% by weight of SBS rubber, preferably 3.5% by weight to 7.5% by weight of SBS rubber, up to 6% by weight of flux oil, up to 3% by weight of solid paraffins having a chain length ranging from $C_{50}$ to $C_{70}$ and a solidification point of above about 95° C., 30% by weight to 60% by weight of distillation bitumen and, as remainder, at least one filler.

The remainder of the at least one filler to complete the bitumen mixture comprising the above-described constituents is preferably in the range from 30% by weight to 70% by weight.

A preferred bitumen mixture, which meets particularly high requirements, comprises up to 2% by weight of paraffins having a chain length of $C_{50}$ to $C_{70}$ and a solidification point of above 95° C., preferably 95° C. to 105° C., in particular above 100° C. to 105° C.

In a development of the invention, the content of a mixture of high-boiling saturated hydrocarbons, preferably so-called flux oil, is between 1% by weight and 4% by weight.

The invention further concerns a use of a bitumen mixture as disclosed herein and in the claims. It is accordingly contemplated to use such a bitumen mixture for producing overlayment roofing membranes. The inventors have found that, surprisingly, the bitumen mixtures of the invention not only are inexpensive to obtain but also, nonetheless, meet the high requirements of overlayment roofing membranes.

The bitumen mixtures of the invention are particularly useful for overlayment roofing membranes comprising one or more reinforcing plies. The bitumen mixtures of the present invention also lead to excellent saturation of the or every desired reinforcing ply. Similarly, delaminations of such overlayment roofing membranes comprising at least one reinforcing ply are consistently avoided at high and low temperatures. Finally, good rollability of such overlayment roofing membranes is ensured even at low temperatures.

Several examples of preferred compositions of the bitumen mixture of the invention will now be described. The examples concern bitumen mixtures for, in particular, overlayment roofing membranes which may comprise one or more, contiguous or spaced-apart reinforcing membranes. But the bitumen mixtures of the invention are also useful for other high-quality, in particular highly stressable, built-structure waterproofing systems, in particular built-structure waterproofing membranes.

Example 1

| | |
|---|---|
| SBS rubber | above 3% by weight to less than or equal to 8% by weight |
| mixture of high-boiling saturated hydrocarbons, in particular so-called flux oil | up to 6% by weight |
| paraffins | up to 3% by weight |
| one or more fillers | 30% by weight to 70% by weight |
| distillation bitumen | remaining % by weight |

Example 2

| | |
|---|---|
| SBS rubber | above 3% by weight to less than or equal to 8% by weight |
| mixture of high-boiling saturated hydrocarbons, in particular so-called flux oil | 1% to 4% by weight |
| paraffins | up to 2% by weight |
| one or more fillers | 30% by weight to 50% by weight |
| distillation bitumen | remaining % by weight |

Example 3

| | |
|---|---|
| distillation bitumen | 30% by weight to 60% by weight |
| SBS rubber | above 3% by weight to less than or equal to 8% by weight |
| mixture of high-boiling saturated hydrocarbons, in particular so-called flux oil | up to 6% by weight |
| paraffins | up to 3% by weight |
| one or more fillers | remaining % by weight |

Example 4

| | |
|---|---|
| distillation bitumen | 30% by weight to 60% by weight |
| SBS rubber | above 3% by weight to less than or equal to 8% by weight |
| mixture of high-boiling saturated hydrocarbons, in particular so-called flux oil | 1% by weight to 4% by weight |
| paraffins | up to 2% by weight |
| one or more fillers | remaining % by weight |

A further four examples of preferred compositions of the bitumen mixture of the invention have an SBS rubber content ranging from 3.5% by weight to 7.5% by weight. All the other constituents, including their reported amount ranges are identical to Examples 1 to 4.

When the above-described preferred examples refer to just paraffins, this in all cases concerns paraffins having a chain length ranging from $C_{50}$ to $C_{70}$ and a solidification point of above about 95° C., preferably between 95° C. and 105° C., in particular above 100° C. to 105° C.

The reported "remaining % by weight" in the four preceding examples is to be understood as meaning that either distillation bitumen (Examples 1 and 2) or fillers (Examples 3 and 4) are present in the bitumen mixture in such an amount that the sum total of all components adds up to 100% by weight. When, for example, distillation bitumen, SBS rubber, flux oil and paraffins together account for a proportion of 60% by weight, the proportion of at least one filler is 40% by weight. Alternatively, the proportion of distillation bitumen is 40% by weight when the sum total of the weight percentages of SBS rubber, flux oil, paraffins and at least one filler is 60% by weight.

What is claimed is:

1. A bitumen mixture for an overlayment roofing membrane comprising:
   distillation bitumen,
   SBS rubber, wherein the SBS rubber content is greater than 3% by weight to less than or equal to 8% by weight,
   at least one filler,
   up to 6% by weight of a mixture of high-boiling saturated hydrocarbons, and
   up to 3% by weight of solid paraffins having a chain length ranging from $C_{50}$ to $C_{70}$ and a solidification point of above about 95° C.

2. The bitumen mixture according to claim 1, comprising:
   greater than 3% by weight to less than or equal to 8% by weight of SBS rubber, up to 6% by weight of a mixture of high-boiling saturated hydrocarbons,
up to 3% by weight of solid paraffins having a chain length ranging from $C_{50}$ to $C_{70}$ and a solidification point of above about 95° C.,
30% by weight to 70% by weight of at least one filler, and
a remainder of distillation bitumen.

3. The bitumen mixture according to claim 1, comprising a distillation bitumen content of 30% by weight to 60% by weight.

4. The bitumen mixture according to claim 1, comprising:
greater than 3% by weight to less than or equal to 8% by weight of SBS rubber,
up to 6% by weight of a mixture of high-boiling saturated hydrocarbons,
up to 3% by weight of solid paraffins having a chain length ranging from $C_{50}$ to $C_{70}$ and a solidification point of above about 95° C.,
30% by weight to 60% by weight of distillation bitumen, and
a remainder of at least one filler.

5. The bitumen mixture according to claim 1, comprising a content of fillers or just one filler of 30% by weight to 70% by weight.

6. The bitumen mixture according to claim 1, comprising a content of paraffins having a chain length ranging from $C_{50}$ to $C_{70}$ and a solidification point of above about 95° C., of up to 2% by weight.

7. The bitumen mixture according to claim 1, comprising a SBS rubber content of 3.5% by weight to 7.5% by weight.

8. The bitumen mixture according to claim 1, comprising a mixture of high-boiling saturated hydrocarbons of 1% by weight to 4% by weight.

9. A method for producing an overlayment roofing membrane by applying a bitumen mixture comprising:
distillation bitumen,
SBS rubber, wherein the SBS rubber content is greater than 3% by weight to less than or equal to 8% by weight,
at least one filler,
up to 6% by weight of a mixture of high-boiling saturated hydrocarbons, and
up to 3% by weight of solid paraffins having a chain length ranging from $C_{50}$ to $C_{70}$ and a solidification point of above about 95° C.

10. A method for producing an overlayment roofing membrane by combining at least one reinforcing ply with a bitumen mixture comprising:
distillation bitumen,
SBS rubber, wherein the SBS rubber content is greater than 3% by weight to less than or equal to 8% by weight,
at least one filler,
up to 6% by weight of a mixture of high-boiling saturated hydrocarbons and
up to 3% by weight of solid paraffins having a chain length ranging from $C_{50}$ to $C_{70}$ and a solidification point of above about 95° C.

11. The bitumen mixture according to claim 2, comprising a distillation bitumen content of 30% by weight to 60% by weight.

12. The bitumen mixture according to claim 4, comprising a content of fillers or just one filler of 30% by weight to 70% by weight.

13. The bitumen mixture according to claim 2, comprising as a SBS rubber content of 3.5% by weight to 7.5% by weight.

14. The bitumen mixture according to claim 4, comprising as a SBS rubber content of 3.5% by weight to 7.5% by weight.

15. The bitumen mixture according to claim 5, comprising a content of fillers or just one filler of 30% by weight to 50% by weight.

16. The bitumen mixture according to claim 12, comprising a content of fillers or just one filler of 30% by weight to 50% by weight.

17. The bitumen mixture according to claim 1, comprising a content of paraffins having a chain length ranging from $C_{50}$ to $C_{70}$ and a solidification point of from about 95° C. to about 105° C., of up to 2% by weight.

18. The bitumen mixture according to claim 1, comprising a content of paraffins having a chain length ranging from $C_{50}$ to $C_{70}$ and a solidification point of from about 100° C. to about 105° C., of up to 2% by weight.

* * * * *